US011370649B2

(12) United States Patent
Choi et al.

(10) Patent No.: US 11,370,649 B2
(45) Date of Patent: Jun. 28, 2022

(54) LIQUID DISPENSING APPARATUS AND METHOD OF CONTROLLING THE SAME

(71) Applicant: LG ELECTRONICS INC., Seoul (KR)

(72) Inventors: Seongjun Choi, Seoul (KR); Min Jo, Seoul (KR); Hyeok Choi, Seoul (KR); Younghoon Ha, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 666 days.

(21) Appl. No.: 16/031,034

(22) Filed: Jul. 10, 2018

(65) Prior Publication Data

US 2019/0023554 A1 Jan. 24, 2019

(30) Foreign Application Priority Data

Jul. 19, 2017 (KR) ........................ 10-2017-0091526

(51) Int. Cl.

| | |
|---|---|
| ***B67D 3/00*** | (2006.01) |
| ***H05B 6/10*** | (2006.01) |
| ***F24H 1/12*** | (2022.01) |
| ***F24D 19/10*** | (2006.01) |
| ***F24D 17/00*** | (2022.01) |

(Continued)

(52) U.S. Cl.

CPC ......... *B67D 3/0022* (2013.01); *B67D 1/0895* (2013.01); *B67D 1/1206* (2013.01);

(Continued)

(58) Field of Classification Search

CPC .. B67D 3/0022; B67D 3/0074; B67D 3/0041; B67D 2210/00002; B67D 2210/00118;

(Continued)

(56) References Cited

U.S. PATENT DOCUMENTS 4,978,833 A * 12/1990 Knepler .................. F24H 1/202 392/402
10,974,944 B2 * 4/2021 Lee ......................... E03C 1/044

(Continued)

FOREIGN PATENT DOCUMENTS

EP 2 694 882 11/2016
JP H03-164650 7/1991

(Continued)

OTHER PUBLICATIONS

Korean Office Action dated Jul. 20, 2018 issued in KR Application No. 10-2017-0091526.

(Continued)

*Primary Examiner* — Frederick C Nicolas
(74) *Attorney, Agent, or Firm* — Ked & Associates LLP

(57) ABSTRACT

A water dispensing apparatus includes a hot water module configured to heat supplied water using an induction heating method, a water supply pipe configured to supply water to the hot water module, a flow rate control valve provided on the water supply pipe to control a flow rate of water supplied to the hot water module, a flow rate sensing device provided on the water supply pipe to sense the flow rate of water supplied to the hot water module, and a controller configured to increase an opening speed of the flow rate control valve when the flow rate of supplied water sensed through the flow rate sensing device is equal to or less than a set flow rate.

12 Claims, 1 Drawing Sheet

(51) Int. Cl.

| | |
|---|---|
| ***F24H 9/1818*** | (2022.01) |
| ***B67D 1/12*** | (2006.01) |
| ***F24H 1/18*** | (2022.01) |
| ***B67D 1/08*** | (2006.01) |

(52) U.S. Cl.
CPC ......... *B67D 3/0041* (2013.01); *B67D 3/0074* (2013.01); *F24D 17/0089* (2013.01); *F24D 19/1051* (2013.01); *F24H 1/121* (2013.01); *F24H 1/185* (2013.01); *F24H 9/1818* (2013.01); *H05B 6/108* (2013.01); *B67D 2210/00002* (2013.01); *B67D 2210/00118* (2013.01); *F24H 2250/08* (2013.01)

(58) Field of Classification Search
CPC . B67D 1/0895; B67D 1/1206; F24D 17/0089; F24D 19/1051; F24H 1/121; F24H 2250/08; F24H 9/1818; F24H 1/185; H05B 6/108
See application file for complete search history.

(56) References Cited

U.S. PATENT DOCUMENTS

| | | | | |
|---|---|---|---|---|
| 2010/0276616 | A1 | 11/2010 | Kim | |
| 2012/0195577 | A1 | 8/2012 | Lee | |
| 2014/0297048 | A1* | 10/2014 | Buchheit | H04L 12/282 700/283 |
| 2015/0225226 | A1* | 8/2015 | You | B67D 1/0884 222/54 |
| 2019/0194033 | A1* | 6/2019 | Lee | C02F 9/005 |
| 2020/0132312 | A1* | 4/2020 | Hasegawa | F24D 17/0078 |
| 2020/0354210 | A1* | 11/2020 | Lee | F24H 9/1818 |

FOREIGN PATENT DOCUMENTS

| | | |
|---|---|---|
| JP | H06-272960 | 9/1994 |
| KR | 10-2012-0112060 | 10/2012 |
| KR | 10-2016-0116405 | 10/2016 |
| KR | 10-2017-0022901 | 3/2017 |
| KR | 10-2017-0063451 | 6/2017 |
| WO | WO 2012/134189 | 10/2012 |

OTHER PUBLICATIONS

Korean Office Action dated May 8, 2019 issued in KR Application No. 10-2019-0050763.

Australian Office Action dated May 29, 2019 issued in AU Application No. 2018206748.

* cited by examiner

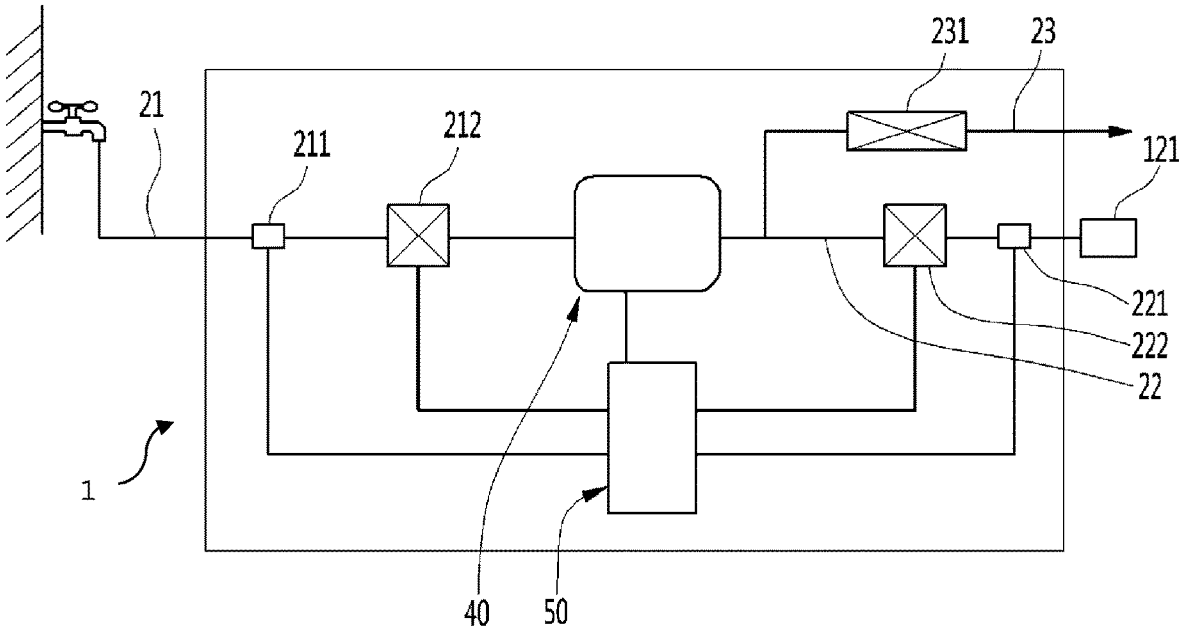
21
211
212
231
23
121
221
222
22
1
40
50

LIQUID DISPENSING APPARATUS AND METHOD OF CONTROLLING THE SAME

CROSS-REFERENCE TO RELATED APPLICATION

This application claims priority under 35 U.S.C. § 119 to Korean Application No. 10-2017-0091526, filed on Jul. 19, 2017, whose entire disclosure is hereby incorporated by reference.

BACKGROUND

1. Field

The present specification relates to a water dispensing apparatus and a method of controlling the same.

2. Background

In general, a water dispensing apparatus dispenses water and is capable of discharging water as much as a user desires. Such a water dispensing apparatus may generally discharge stored water through a nozzle when the user operates a lever or a button. Specifically, the water dispensing apparatus is configured to open the valve of the nozzle to discharge water while the user operates the lever or the button, and the user ends the operation of the lever or the button while confirming the amount of water in a cup or a container.

Such a water dispensing apparatus is applicable to various fields such as a refrigerator and a water purifier. In particular, the water dispensing apparatus provided in the refrigerator or the water purifier is configured to have a function for dispensing water of an amount automatically set according to a user's operation. Recently, water dispensing apparatuses capable of dispensing not only purified water but also cold water and hot water have been developed as the water dispensing apparatus.

Meanwhile, if the flow rate of water dispensed by the water dispensing apparatus for dispensing hot water is not constant, temperature change of the hot water may be large. In particular, when the flow rate of supplied water is decreased, water may be overheated by a heater for heating water with fixed output. To this end, the heater is damaged or water boils, generating steam and damaging a flow passage or causing a problem of safety.

In order to solve such problems, Korean Patent Laid-Open Publication No. 10-2012-0112060 discloses a hot water dispensing apparatus for sensing the flow rate of supplied water and preventing a heater from operating when the flow rate of the supplied water is less than a minimum flow rate. However, in such related art, if the flow rate is unstable, the heater is turned off and the temperature of discharged water may not be satisfied.

In addition, a water dispensing apparatus for controlling the output of an induction heating type hot water module according to decrease in flow rate of supplied water or temperature of discharged water to discharge hot water having a constant temperature has been disclosed. In such a water dispensing apparatus, the amount of previously discharged water was memorized, the degree of opening of the valve was automatically set, and, when hot water is discharged, the flow rate of water was controlled according to the degree of opening of the valve.

However, in such a conventional water dispensing apparatus, when water flows into a hot water tank at a flow rate significantly lower than the flow rate of previously discharged water, a boiling phenomenon occurs in the hot water tank. As a result, hot water may spout from a cock for discharging hot water and a user safety may be jeopardized.

The above reference is incorporated by reference herein where appropriate for appropriate teachings of additional or alternative details, features and/or technical background.

BRIEF DESCRIPTION OF THE DRAWINGS

The embodiments will be described in detail with reference to the following drawings in which like reference numerals refer to like elements, and wherein:

FIG. 1 is a schematic block diagram showing a hot water flow passage of a water dispensing apparatus according to an embodiment of the present disclosure;

FIG. 2 is a perspective view of a hot water module which is a main component of the water dispensing apparatus;

FIG. 3 is an exploded perspective view of the hot water module which is the main component of the water dispensing apparatus;

FIG. 4 is a flowchart illustrating a method of controlling a water dispensing apparatus according to one embodiment of the present disclosure;

FIG. 5 is a graph showing temperature change in hot water tank when water is supplied at a reference flow rate;

FIG. 6 is a graph showing temperature change in hot water tank when water is supplied at a flow rate less than a reference flow rate;

FIG. 7 is a graph showing change in flow rate of supplied water according to time under a normal condition and change in flow rate of supplied water according to time under a flow rate reduction condition;

FIG. 8 is a graph showing change in flow rate of supplied water according to time when the control method of the present disclosure is performed under the flow rate reduction condition;

FIG. 9 is a graph showing comparison of changes in temperature of hot water in a hot water tank according to a flow rate sensing time for comparison with a reference flow rate;

FIG. 10 is a graph showing comparison of distribution of flow rate values according to pressure reduction upon determining a flow rate at a time of 3.5 seconds after opening a valve;

FIG. 11 is a table summarizing the results of a rising acceleration time; and FIG. 12 is a table summarizing the results of a falling acceleration time.

DETAILED DESCRIPTION

Hereinafter, specific embodiments of the present disclosure will be described in detail with reference to the drawings. However, it should be understood that the present disclosure is not limited to the embodiment within the spirit of the present disclosure, and other embodiments falling within the spirit and scope of the present disclosure may be easily devised by adding, changing or deleting other elements.

FIG. 1 is a schematic block diagram showing a hot water flow passage of a water dispensing apparatus according to an embodiment of the present disclosure. Referring to FIG. 1, the water dispensing apparatus 1 may be connected to a water supply pipe 21 connected to an external water supply source and water supplied by the water supply pipe 21 may be purified, heated and discharged through a water discharge nozzle 121.

The water dispensing apparatus 1 receives raw water through the water supply pipe 21 connected to the water supply source. In addition, the water supply pipe 21 may be introduced into the water dispensing apparatus 1 and connected to a hot water module for generating hot water.

In addition, a flow rate sensing device (or flow rate sensor) 211 and a flow rate control valve 212 may be provided on the water supply pipe 21 inside the water dispensing apparatus 1. The flow rate sensing device 211 is configured to sense or measure the flow rate of water flowing through the water supply pipe 21. In addition, the flow rate control valve 212 is configured to control a degree of opening and to control the flow rate of water flowing through the water supply pipe 21.

If the amount of water passing through the hot water tank which is one component of the hot water module 40 is too large, it is impossible to efficiently heat water passing through the hot water tank at a high speed. In this state, the temperature condition of the hot water may not be satisfied. Therefore, the flow rate control valve 212 may keep the amount of water passing through the hot water tank 41 constant to always discharge hot water having a uniform temperature. Of course, the flow rate sensing device 211 and the flow rate control valve 212 may be integrally formed.

The water supply pipe 21 supplies water to the hot water module 40 and water heated by passing through the hot water module 40 is discharged to the water discharge nozzle 121 through the water discharge pipe 22. In addition, the water discharge pipe 22 may include a temperature sensing device 221 for sensing the temperature of discharged water. The temperature of finally discharged water may be measured by the temperature sensing device 221. In addition, the water discharge pipe 22 may include a water discharge valve 222 opened or closed to discharge hot water.

In addition, the outlet side of the hot water module 40 may be branched to be further connected to a steam pipe 23. The steam pipe 23 may discharge steam generated when water boils in the hot water tank 41 to the outside. The steam pipe 23 includes a safety valve 231. When pressure greater than set pressure is generated, the safety valve 231 is opened to discharge steam to the outside.

Specifically, the safety valve 231 discharges steam generated when hot water is heated in the hot water tank 41 and prevents the internal pressure of the hot water tank 41 from being excessively increased by steam. The safety valve 231 is configured to be opened at the set pressure and may have various structures capable of smoothly discharging steam from the hot water tank 41. The outlet of the safety valve 231 may be connected to a drain pipe extending to the outside of the water dispensing apparatus 1.

Meanwhile, the output of the hot water module 40 may be controlled by a controller 50. That is, the controller 50 controls the output of the hot water module 40. The controller 50 controls the output of the hot water module according to the flow rate sensed by the flow rate sensing device 211 or the temperature of discharged water sensed by the temperature sensing device 221, such that the supplied water is heated to a constant temperature and then is discharged.

In addition, the controller 50 may increase the opening speed of the flow rate control valve 212 when the flow rate of supplied water sensed through the flow rate sensing device 211 is equal to or less than a reference flow rate, thereby increasing the flow rate of supplied water to a target flow rate within a specific time. Here, it is noted that the opening speed of the flow rate control valve 212 is proportional to the increase speed of the flow rate of supplied water. As used herein, increasing the "opening speed" may generally refer to additionally opening the flow rate control valve 212 to increase the flow rate in real time. For example, the "opening speed" of the flow rate control valve may be proportional to the increase speed of the flow rate of supplied water.

Control of the increase speed of the flow rate of supplied water will be described in greater detail. Hereinafter, the structure of the hot water module 40 will be described in greater detail.

FIG. 2 is a perspective view of a hot water module which is a main component of the water dispensing apparatus, and FIG. 3 is an exploded perspective view of the hot water module. As shown in the figure, the hot water module 40 and the controller 50 may be unified into one module and may be installed in the water dispensing apparatus 1 in the unified state.

The hot water module 40 is configured to heat purified water received through the water supply pipe 21 using an induction heating (IH) method to obtain hot water. Specifically, the hot water module 40 may include a hot water tank 41, through which purified water passes, a working coil 42 for heating water passing through the hot water tank 41 and a mounting bracket 43 on which the working coil 42 and the hot water tank 41 are mounted.

The mounting bracket 43 provides a space in which the hot water tank 41, the working coil 42 and ferrite cores 44 are mounted. In addition, the mounting bracket 43 may be formed of a resin material which is not deformed or damaged even at a high temperature.

Bracket couplers 431 for coupling with the controller 50 are formed at an edge of the mounting bracket 43. A plurality of bracket couplers 431 may be provided and the extended ends of the bracket couplers 431 may have different shapes and have directivity. Accordingly, the hot water module 40 may be engaged with the controller 50 and the hot water module 40 may be mounted at an accurate position.

In addition, a bracket mounting part 432 in which a sensor bracket 45 is mounted may be further formed at the center of one surface of the mounting bracket 43 on which the hot water tank 41 is mounted. A tank temperature sensor 451 and a fuse 452 may be provided at the center of the bracket mounting part 432.

A tank temperature sensor 451 for measuring the temperature of the hot water tank 41 may be mounted on the sensor bracket 45. The tank temperature sensor 451 measures the temperature of the center of the hot water tank 41, thereby determining the temperature of hot water without directly measuring the temperature of the hot water in the hot water tank 41. Accordingly, the temperature of the discharged hot water may be maintained in an appropriate range by the tank temperature sensor 451. That is, it is possible to determine whether additional heating is performed or heating is stopped is determined by the temperature sensed by the tank temperature sensor 451.

The fuse 452 may be mounted on the sensor bracket 45. The fuse 452 cuts off the power of the hot water module 40 when water in the hot water tank 41 is excessively overheated.

A plurality of coil fixing parts 453 may be formed on the circumference of the sensor bracket 45. The coil fixing parts 453 may extend outward from the outer side surface of the sensor bracket 45 and may extend to fix the working coil 42 mounted on the mounting bracket 43. Two coil fixing parts

453 may be provided on each of the upper and lower sides of the sensor brackets 45 and may diagonally extend from both corners to press and fix the working coil 42.

The working coil 42 is provided on the front surface of the mounting bracket 43. The working coil 42 forms a magnetic force line which heats the hot water tank 41. When current is supplied to the working coil 42, the magnetic force line is formed in the working coil 42. This magnetic force line affects the hot water tank 41 and the hot water tank 41 is affected by the magnetic force line to generate heat.

The working coil 42 is provided on the front surface of the mounting bracket 43 and is provided to face one surface having a planar shape between both surfaces of the hot water tank 41. The working coil 42 is made of a plurality of strands of copper or other conductor wires and the strands are insulated. In addition, the working coil 42 forms a magnetic field or a magnetic force line by current applied to the working coil 42.

Therefore, the front surface of the hot water tank 41 facing the working coil 42 is affected by the magnetic force line formed by the working coil 42 to generate heat. The strands of the working coil 42 are not shown in detail in the figure, but only the overall outline of the working coil 42 formed by winding the strands outside the bracket mounting part 432 is shown.

The ferrite cores 44 are provided on the front surface of the working coil 42. The ferrite cores 44 serve to suppress current loss and serves as a film for shielding the magnetic force line. The working coil 42 may include a plurality of ferrite cores 44 and the plurality of ferrite cores 44 may be radially provided with respect to the central portion of the working coil 42.

The ferrite cores 44 may be fixed to core fixing parts 433 of the mounting bracket 43. The ferrite cores 44 may be adhered to or fitted in or engaged with the core fixing parts 433. A plurality of core fixing parts 433 may be radially formed similarly to the ferrite cores 44.

Joining parts 434, with end portions of the hot water tank 41 are engaged in a state of mounting the hot water tank 41, may be further formed on the circumference of the mounting bracket 43. Accordingly, the working coil 41, the ferrite cores 44, the sensor bracket 45 and the hot water tank 41 are coupled as in the form of one module in a state of being mounted on the mounting bracket 43.

The hot water tank 41 is mounted on the front surface of the mounting bracket 43. The hot water tank 41 is affected by the magnetic force line formed by the working coil 42 to generate heat. Accordingly, purified water is heated while passing through the internal space of the hot water tank 41 to become hot water.

In addition, the overall shape of the hot water tank 41 may be flat and compact. The hot water tank 41 may be formed such that the overall shape thereof corresponds to that of the hot water module 40, thereby effectively heating the hot water tank 41 when the hot water module 40 is driven.

Specifically, the hot water tank 41 may be configured by adhering the circumferences of a first tank part 411 having a planar plate shape and a plate-shaped second tank part 412, at least a portion of which is recessed to form a flow passage. An output pipe 414 for discharging heated water is formed at an upper end of the hot water tank 41 and an input pipe 413 for supplying water to be heated is formed at a lower end of the hot water tank 41. Accordingly, when water is supplied through the input pipe 413 and is discharged through the output pipe 414, the hot water tank 41 may be instantaneously heated by induced electromotive force formed in the working coil 42, thereby discharging hot water.

Meanwhile, the surface, which faces the working coil, of the first tank part 411 is formed in a planar shape and is adjacent to the working coil 41, such that the overall surface thereof is uniformly heated by induced electromotive force generated by the working coil 42.

A plurality of forming parts 412*a* may be formed in the second tank part 412. The forming parts 412*a* may be recessed toward the first tank part 411 and are brought into contact with the inner surface of the first tank part 411 when the first tank part 411 and the second tank part 412 are coupled, such that the first tank part 411 and the second tank part 412 are spaced apart from each other. Accordingly, the first tank part 411 and the second tank part 412 form a space, through which water flow, by the forming parts 412*a*.

The plurality of forming parts 412*a* may be formed at positions adjacent to the input pipe 413 and the output pipe 414 and may be spaced apart from each other in the width direction of the hot water tank 41. Accordingly, water flowing in the hot water tank 41 may be dispersed in the entire region of the hot water tank 41, thereby being effectively heated by the working coil 42. That is, water flowing in the hot water tank 41 having a small thickness and a large area is rapidly heated by the working coil 42, thereby being heated to a temperature necessary to discharge water.

The controller 50 may be provided behind the hot water module 40. The controller 50 may be connected to a number of valves and electrical parts, such as the hot water module 40, the flow rate sensing device 211, the flow rate control valve 212, the temperature sensing device 221 and the water discharge valve 222. Of course, the controller 50 may include a plurality of units and may be divided into a unit for controlling the hot water module 40 and a unit for controlling the other components.

The controller 50 may include a control PCB 51, a control case 52 and a control cover 53. The control PCB 51 may be mounted in the control case 52 to control driving of the hot water module 40. In addition, the control PCB 51 may control driving valves connected to the hot water module 40.

The control case 52 accommodates the control PCB and one opened surface thereof may be shielded by the control cover 53. Accordingly, the control PCB 51 may be maintained to be accommodated by coupling between the control case 52 and the control cover 53.

A shield plate 54 may be provided on the front surface of the control cover 53. The shield plate 54 may be formed on the entire front surface of the control cover 53 to prevent magnetic force lines from being transmitted to the control PCB 51 upon driving the hot water module 40. The shield plate 54 may be formed in a separate sheet shape and may be mounted on the front surface of the control cover 53.

Hereinafter, a method of controlling a dispensing apparatus according to the embodiment of the present disclosure having the above-described structure will be described. FIG. 4 is a flowchart illustrating a method of controlling a water dispensing apparatus according to one embodiment of the present disclosure.

Referring to FIG. 4, first, a hot water discharge command is received from a user [S101]. Thereafter, the flow rate control valve 212 is opened [S102]. In step S102, the flow rate control valve 212 may be opened at a constant speed. As described above, when the flow rate control valve 212 is opened at a constant speed, the flow rate of water passing through the flow rate control valve 212 is increased at a constant rate.

Here, the opening speed of the flow rate control valve 212 may be set by a manager. In addition, the opening speed of the flow rate control valve may mean the speed at which the flow rate control valve 212 is opened in an (n−1)-th hot water discharge process performed immediately before a current (n-th) hot water discharge process. In the latter case, information on the speed at which the flow rate control valve 212 in the previous ((n−1)-th) hot water discharge process and the flow rate and temperature of the discharged hot water may be stored in a separate memory.

Thereafter, after a set time, the flow rate sensing device 211 senses the flow rate of water passing through the flow rate control valve 212 and compares the sensed flow rate with a reference flow rate [S103]. In step S103, the opening speed of the flow rate control valve 212 may be maintained or accelerated according to the result of comparison.

Here, the set time may be 3.5 seconds, for example, and the reason therefor will be described later. First, if the flow rate sensed in step S103 is equal to or greater than a predetermined reference flow rate, a normal mode is maintained [S104]. That is, the current opening speed is maintained without increasing the opening speed of the flow rate control valve 212.

In contrast, if the flow rate sensed in step S103 is less than the reference flow rate, an "acceleration" mode is performed [S105]. Specifically, if the flow rate sensed in step S103 is less than the reference flow rate, the opening speed of the flow rate control valve 212 is increased. When the opening speed of the flow rate control valve 212 is increased, the amount of water passing through the flow rate control valve 212 is further increased.

When the opening speed of the flow rate control valve 212 in step S102 is referred to as a "first speed" and the opening speed of the flow rate control valve 212 in step S105 is referred to as a "second speed", the "second speed" is greater than the "first speed". If the flow rate in the current (n-th) hot water discharge process is significantly lower than the previous ((n−1)-th) hot water discharge process, a boiling phenomenon occurs in the hot water tank 41 and water may be sprayed around the water discharge nozzle 121.

Accordingly, if the flow rate of water supplied to the hot water tank 41 is small, since the flow rate needs to be rapidly increased, the opening speed of the flow rate control valve 212 is further increased. As described above, after step S105 of increasing the opening speed of the flow rate control valve 212, the flow rate sensing device 211 senses the flow rate in real time and compares the sensed flow rate with a predetermined first target flow rate [S106].

If the sensed flow rate reaches the first target flow rate, the flow rate of water passing through the flow rate control valve 212 is decreased [S107]. That is, the inner diameter of the flow rate control valve 212, through which water passes, is gradually decreased.

At this time, the decrease speed of the flow rate in step S107 may be a "third speed" and a "fourth speed". First, the "third speed" is a speed at which the flow rate is decreased when the sensed flow rate reaches the first target flow rate in the "normal mode" and the "fourth speed" is a speed at which the flow rate is decreased when the sensed flow rate reaches the first target flow rate in the "acceleration mode".

At this time, the "fourth speed" is greater than the "third speed". That is, in the "acceleration mode", the flow rate is more rapidly decreased than in the "normal mode" and the reason therefor will be described later.

After step S107, when the sensed flow rate reaches a second target flow rate less than the first target flow rate [S108], the flow rate of water passing through the flow rate control valve 212 is increased [S109]. After step S109, when the sensed flow rate reaches a predetermined third target flow rate greater than the second target flow rate and less than the first target flow rate [S110], the flow rate of water passing through the flow rate control valve 212 is constantly maintained [S111].

In the present disclosure, if the flow rate of water supplied to the hot water tank 41 is significantly small, in order to prevent water from boiling, it is possible to accelerate the opening speed of the valve 212 for controlling the flow rate of supplied water to secure a sufficient flow rate and to prevent a boiling phenomenon in the hot water tank 41.

FIGS. 5 to 6 are graphs showing temperature change in hot water tank according to the flow rate of supplied water. FIG. 5 is a graph showing temperature change in hot water tank when water is supplied at a reference flow rate, and FIG. 6 is a graph showing temperature change in hot water tank when water is supplied at a flow rate less than a reference flow rate.

Referring to FIG. 5, it can be seen that, when water is supplied to the hot water tank at a normal flow rate (equal to or greater than a reference flow rate), the flow rate reaches a target flow rate (400 LPM) within a target time (5 seconds) and the maximum temperature of the discharged hot water is restricted to 96.5° C., such that water does not boil and the hot water is stably discharged.

In contrast, referring to FIG. 6, it can be seen that, when water is supplied to the hot water tank at the flow rate less than the reference flow rate, the flow rate cannot reach the target flow rate (400 LPM) within a target time and reaches the target flow rate within a delayed time (12 seconds), the maximum temperature of hot water is increased to 102.5° C. for the delayed time and boiling occurs. In this case, water spouts from the water discharge nozzle.

FIG. 7 is a graph showing change in flow rate of supplied water according to time under a normal condition and change in flow rate of supplied water according to time under a flow rate reduction condition. FIG. 8 is a graph showing change in flow rate of supplied water according to time when the control method of the present disclosure is performed under the flow rate reduction condition.

First, referring to FIG. 7, it can be seen that, when water is supplied at a flow rate less than a reference flow rate, a time required to reach a target flow rate (peal point) is delayed by 7 seconds as compared to the case where water is supplied at a normal flow rate. At this time, the temperature of water in the hot water tank exceeds 100° C., thereby causing primary boiling. In addition, after reaching the target flow rate (peal point), a process of decreasing the flow rate and then increasing the flow rate again is also delayed and the temperature of the water in the hot water tank exceeds 100° C., thereby causing secondary boiling.

In contrast, referring to FIG. 8, it can be seen that, even when water is supplied at a flow rate less than the reference flow rate, the flow rate is sensed in real time at a predetermined point of time (3.5 seconds) and, upon determining that the flow rate is less than the reference flow rate, the increase speed of the flow rate (the opening speed of the flow rate control valve) is increased to reach the target flow rate (peal point) within the target time (within 6 seconds).

In addition, as described above, after accelerating the opening speed of the valve, upon reaching the target flow rate (peal point), the decrease speed of the flow rate is accelerated as compared to a predetermined speed. Thereafter, the flow rate is increased again, thereby preventing primary and secondary spouting of water from the hot water tank.

Hereinafter, a hot water discharge process using the control method according to the present disclosure will be described. For example, the "normal mode" will be described. The "normal mode" means that the flow rate of water supplied to the hot water tank is equal to or greater than a reference flow rate.

First, in a state in which the water dispensing apparatus is in a standby mode, when the user presses a hot water button, the flow rate control valve 212 is opened. At this time, the flow rate control valve 212 is opened at a constant speed and the flow rate of water supplied to the hot water tank is increased at a constant speed V1.

Thereafter, when the reference time (about 3.5 seconds) is reached, the flow rate sensing apparatus 211 senses the flow rate of water supplied to the hot water tank and the controller compares the sensed flow rate with the reference flow rate. If the sensed flow rate is equal to or greater than the reference flow rate, the flow rate control valve 212 is continuously opened at the same speed and the flow rate of water supplied to the hot water tank is increased at the same speed V1.

Thereafter, when the flow rate of water supplied to the hot water tank reaches the first target flow rate, the flow rate of water supplied to the hot water tank is reduced at a constant speed V3. For this purpose, the flow rate control valve 212 is closed at a constant speed. That is, the inner diameter of the flow rate control valve 212, through which water passes, is reduced at a constant speed.

Thereafter, when the flow rate of water supplied to the hot water tank reaches the second target flow rate less than the first target flow rate, the flow rate of water supplied to the hot water tank is increased at a constant speed again. For this purpose, the flow rate control valve 212 is opened at a constant speed. That is, the inner diameter of the flow rate control valve 212, through which water passes, is increased at a constant speed.

Thereafter, when the flow rate of water supplied to the hot water tank reaches the third target flow rate less than the first target flow rate and greater than the second target flow rate, the flow rate of water supplied to the hot water tank is constantly maintained. For this purpose, the flow rate control valve 212 is fixed without being further opened or closed. That is, the inner diameter of the flow rate control valve 212, through which water passes, is constantly maintained.

As another example, the "acceleration mode" will be described. The "acceleration mode" means that the flow rate of water supplied to the hot water tank is less than the reference flow rate. First, similarly to the "normal mode", in a state in which the water dispensing apparatus is in a standby mode, when the user presses the hot water button, the flow rate control valve 212 is opened.

At this time, the flow rate control valve 212 is opened at a constant first speed and the flow rate of water supplied to the hot water tank is increased at the constant speed V1. Thereafter, when the reference time (about 3.5 seconds) is reached, the flow rate sensing apparatus 211 senses the flow rate of water supplied to the hot water tank and the controller compares the sensed flow rate with the reference flow rate. At this time, when the sensed flow rate is less than the reference flow rate, the flow rate control valve is opened at a second speed greater than the first speed and the flow rate of water supplied to the hot water tank is increased at a speed V2 greater than the previous speed V1.

Thereafter, when the flow rate of water supplied to the hot water tank reaches the first target flow rate, the flow rate of water supplied to the hot water tank is decreased at a constant speed (V4) (at this time, V4>V3). For this purpose, the flow rate control valve 212 is closed at a constant speed. That is, the inner diameter of the flow rate control valve 212, through which water passes, is decreased at a constant speed.

Thereafter, when the flow rate of water supplied to the hot water tank reaches the second target flow rate less than the first target flow rate, the flow rate of water supplied to the hot water tank is increased at a constant speed again. For this purpose, the flow rate control valve 212 is opened again at a constant speed. That is, the inner diameter of the flow rate control valve 212, through which water passes, is increased at a constant speed.

Thereafter, when the flow rate of water supplied to the hot water tank reaches the third target flow rate less than the first target flow rate and greater than the second target flow rate, the flow rate of water supplied to the hot water tank is constantly maintained. For this purpose, the flow rate control valve is fixed without being further opened or closed. That is, the inner diameter of the flow rate control valve 212, through which water passes, is constantly maintained.

Hereinafter, numeral limitations such as the reference flow rate of the present disclosure, a flow rate sensing time point for comparison with the reference flow rate and the speed control (acceleration) time of the valve will be described. FIG. 9 is a graph comparison of changes in temperature of hot water in a hot water tank according to a flow rate sensing time for comparison with a reference flow rate. Specifically, FIG. 9 is a graph showing comparison of test results for selecting an optimal flow rate determination time by measuring temperature change of hot water at certain flow rate determination times (3.0 s, 3.5 s and 4.0 s).

For reference, the test method was as follows: after pressure is reduced from 3 kgf to 1.5 kgf, water was discharged to examine the adverse effects of a change point and the test was carried out four times while changing a condition according to time. The conditions of four times are shown in Table 1 below.

TABLE 1

| | Sample condition | | | |
|---|---|---|---|---|
| | First time | Second time | Third time | Fourth time |
| Flow rate sensor | 0.5794 cc/Hz (+7.2%) Upper limit | 0.4980 cc/Hz (−7.8%) Lower limit | 0.5753 cc/Hz (+6.5%) Upper limit | 0.5026 cc/Hz (−6.9%) Lower limit |
| Flow rate control valve | 95 gpm (+95%) Upper limit | 4 gpm (+4%) Lower limit | 91 gpm (+91%) Upper limit | 14 gpm (+14%) Lower limit |

In addition, the measured values of the maximum temperature and the temperature of discharged water based on sample condition according to time are shown in Table 2 below.

TABLE 2

| Sample | Flow rate determination time 3.0 s | | Flow rate determination time 3.5 s | | Flow rate determination time 4.0 s | |
|---|---|---|---|---|---|---|
| | Maximum temperature | Temperature of discharged water | Maximum temperature | Temperature of discharged water | Maximum temperature | Temperature of discharged water |
| First time | 89.3 | 75.2 | 96.5 | 80.2 | 101.0 | 78.2 |
| Second time | 88.5 | 73.8 | 97.1 | 78.1 | 101.5 | 80.2 |
| Third time | 86.2 | 76.2 | 94.5 | 79.1 | 99.6 | 79.5 |
| Fourth time | 86.7 | 74.5 | 95.9 | 77.3 | 98.1 | 77.5 |

First, (a) of FIG. 9 is a graph showing change in temperature of hot water when the opening speed of the flow rate control valve is increased after sensing the flow rate at 3.0 seconds. Referring to (a) of FIG. 9, the maximum temperature of hot water is 89.3° C., which does not exceed 100° C., such that water does not boil. However, the temperature (about 73.8° C.) of discharged water is unsatisfactory.

In addition, (c) of FIG. 9 is a graph showing change in temperature of hot water when the opening speed of the flow rate control valve is increased after sensing the flow rate at 4.0 seconds. Referring to (c) of FIG. 9, the temperature of discharged water is satisfactory, but the maximum temperature of hot water is 101.5° C., thereby causing boiling and spouting.

In contrast, (b) of FIG. 9 is a graph showing change in temperature of hot water when the opening speed of the flow rate control valve is increased after sensing the flow rate at 3.5 seconds. Referring to (b) of FIG. 9, the maximum temperature of hot water is 96.5° C., such that water does not boil. In addition, the temperature (about 80.2° C.) of discharged water is satisfactory. Accordingly, sensing of the flow rate for comparison with the reference flow rate may be performed 3 to 4 seconds, preferably, 3.5 seconds, after the flow rate control valve 212 is opened.

FIG. 10 is a graph showing comparison of distribution of flow rate values according to pressure reduction upon determining a flow rate 3.5 seconds after opening a valve. FIG. 10 shows a test result for selecting an acceleration reference flow rate at the flow rate determination time (3.5 s). In the test method, when pressure is reduced from 3 kgf to 1.5 kgf and when water is discharged at hydrostatic pressure of 3 kgf/cm2, the flow rate was measured at a time of 3.5 s and an acceleration reference flow rate was selected by comparing two flow rates.

Referring to FIG. 10, it can be seen that, when a 1.5K pressure reduction condition, a 3.0K hydrostatic pressure condition and a flow rate distribution at a time of 3.5 s are taken into consideration, the acceleration determination reference flow rate is 220 to 240 gpm (preferably, 230 gpm).

FIG. 11 is a table summarizing the results of a rising acceleration time. For reference, the "rising acceleration time" means a time required to compare a reference flow rate (230 gpm) with a current flow rate at a reference time (3.5 seconds) and to increase the valve opening speed when the current flow rate is less than the reference flow rate.

Referring to FIG. 11, when the rising acceleration time is less than 0.5 seconds, the flow rate risen by 800 gpm or more at a single acceleration, thereby causing overshoot and, when the rising acceleration time exceeds 1.0 seconds, there is not improvement in a spouting problem due to a small increase.

Accordingly, the rising acceleration time is preferably in a range of 0.5 seconds to 1.0 second. For reference, a "rising acceleration slope" may be defined by Equation 1 below. The "rising acceleration slop" means the slope of the "rising acceleration" period of FIG. 8.

Rising acceleration slope=(first target flow rate−current flow rate)/rising acceleration time (*a*) [Equation 1]

FIG. 12 is a table summarizing the results of a falling acceleration time. For reference, the "falling acceleration time" means a time required to increase the valve closing speed in order to decrease the flow rate as the flow rate reaches the first target flow rate in a state of increasing the valve opening speed.

Referring to FIG. 12, when the falling acceleration time is less than 0.5 seconds, the flow rate is decreased to the second target flow rate or less by a single acceleration, thereby causing overshoot. When the falling acceleration time exceeds 0.9 seconds, the temperature is unsatisfactory due to a small decrease.

Accordingly, the falling acceleration time is preferably in a range of 0.5 seconds to 0.9 seconds. For reference, a "falling acceleration slope" may be defined by Equation 2 below. The "falling acceleration slope" means the slope of the "falling acceleration" period of FIG. 8.

Falling acceleration slope=(current flow rate−second target flow rate)/falling acceleration time (*b*) [Equation 2]

According to the water dispensing apparatus and the method of controlling the same according to the embodiment of the present disclosure, the flow rate of supplied water is sensed by the flow rate sensing device and, when the sensed flow rate is less than the reference flow rate, the valve opening speed is instantaneously increased to dispense water at a target flow rate within a target time. Therefore, it is possible to prevent water from boiling in the hot water tank at 100° C. or higher and to prevent hot water from being scattered or sprayed around the water discharge nozzle.

An aspect of the present disclosure provides a water dispensing apparatus capable of dispensing hot water having a constant temperature regardless of change in flow rate of supplied water, and a method of controlling the same. Another aspect of the present disclosure provides a water dispensing apparatus capable of determining whether the flow rate of supplied water is rapidly decreased and accelerating the opening speed of a valve for controlling the flow rate of supplied water to ensure a target flow rate within a target time, to prevent water from boiling in a hot water module and to prevent water from spouting from a water discharge nozzle, and a method of controlling the same.

A water dispensing apparatus according to an aspect may include a hot water module configured to heat supplied water using an induction heating method, a water supply pipe configured to supply water to the hot water module, a flow rate control valve provided on the water supply pipe to control a flow rate of water supplied to the hot water module, a flow rate sensing device provided on the water supply pipe to sense the flow rate of water supplied to the hot water module, and a controller configured to increase an opening speed of the flow rate control valve when the flow rate of supplied water sensed through the flow rate sensing device is equal to or less than a set flow rate.

The hot water module may include a hot water tank, through which purified water passes, a working coil wound a plurality of times at a position facing the hot water tank to emit electromagnetic force for induction-heating the hot water tank, a plurality of ferrite cores radially arranged with respect to a center of the working coil to prevent loss of the electromagnetic force generated in the working coil, and a mounting bracket on which the hot water tank, the working coil and the ferrite cores are mounted in the form of a module. The flow rate control valve and the flow rate sensing device may be integrally configured.

A method of controlling a water dispensing apparatus according to an embodiment of the present disclosure may include a first step of opening a flow rate control valve at a first speed by a hot water discharge operation of a user, a second step of sensing a flow rate of water supplied to a hot water module by a flow rate sensing device, a third step of comparing the sensed flow rate with a reference flow rate, and a fourth step of, at a controller, increasing an opening speed of the flow rate control valve from the first speed to a second speed when the sensed flow rate is less than the reference flow rate. The second step may be performed 3 to 4 seconds after opening the flow rate control valve. The reference flow rate may be 220 to 240 gpm.

In the fourth step, the opening speed or acceleration of the flow rate control valve may be controlled within 0.5 to 1 second. The method may further include, after the fourth step, a fifth step of, at the controller, decreasing the flow rate of water passing through the flow rate control valve to a fourth speed greater than a predetermined third speed, when the flow rate sensed by the flow rate sensing device reaches a first target flow rate. In the fifth step, the opening speed of the flow rate control valve may be controlled within 0.5 to 0.9 seconds.

The method may further include, after the fifth step, a sixth step of, at the controller, increasing the flow rate of water passing through the flow rate control valve when the flow rate sensed by the flow rate sensing device reaches a second target flow rate. The method may further include, after the sixth step, a seventh step of, at the controller, maintaining the flow rate of water passing through the flow rate control valve when the flow rate sensed by the flow rate sensing device reaches a third target flow rate.

When the sensed flow rate is greater than the reference flow rate, the flow rate control valve may be continuously opened at the first speed. When the flow rate sensed by the flow rate sensing device reaches a first target flow rate in a state in which the flow rate control valve is opened at a first speed, the controller may decrease the flow rate of water passing through the flow rate control valve.

When the flow rate sensed by the flow rate sensing device reaches a second target flow rate in a state in which the flow rate is decreased, the controller may increase the flow rate of water passing through the flow rate control valve to a third target flow rate. When the flow rate sensed by the flow rate sensing device reaches the third target flow rate, the controller may maintain the flow rate of water passing through the flow rate control valve at the third target flow rate.

The water dispensing apparatus and the method of controlling the same according to the embodiments of the present disclosure have the following aspects. According to the water dispensing apparatus and the method of controlling the same according to the embodiment of the present disclosure, the flow rate of supplied water is sensed by the flow rate sensing device and, when the sensed flow rate is less than the reference flow rate, the valve opening speed is instantaneously increased to dispense water at a target flow rate within a target time. Therefore, it is possible to prevent water from boiling in the hot water tank at 100° C. or higher and to prevent hot water from being scattered or sprayed around the water discharge nozzle.

In addition, since water is dispensed at a target flow rate within a target time, it is possible to dispense hot water having a constant temperature to a user regardless of the flow rate of supplied water. In addition, it is possible to prevent a problem of danger occurring due to overheating of hot water when the flow rate of supplied water is rapidly decreased and to prevent the internal components of the water dispensing apparatus from being damaged. It is possible to discharge hot water having a constant temperature regardless of change in flow rate due to simultaneous use of water according to use environment and to ensure quality stability.

It will be understood that when an element or layer is referred to as being “on” another element or layer, the element or layer can be directly on another element or layer or intervening elements or layers. In contrast, when an element is referred to as being “directly on” another element or layer, there are no intervening elements or layers present. As used herein, the term “and/or” includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present disclosure.

Spatially relative terms, such as “lower”, “upper” and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as “lower” relative to other elements or features would then be oriented “upper” relative the other elements or features. Thus, the exemplary term “lower” can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the disclosure. As used herein, the singular forms “a”, “an” and “the” are intended to include the plural forms as well, unless the context clearly indicates otherwise. It will be further understood that the terms “comprises” and/or “comprising,” when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment of the disclosure. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method of controlling a liquid dispensing apparatus, the method comprising:

opening a flow rate control valve at a first speed during a hot liquid discharge operation;

sensing a flow rate of liquid supplied to a hot liquid module;

comparing the sensed flow rate to a reference flow rate; and accelerating an opening speed of the flow rate control valve from the first speed to a second speed that is greater than the first speed when the sensed flow rate is less than the reference flow rate.

2. The method according to claim 1, wherein sensing the flow rate of the liquid supplied to the hot liquid module is performed 3 to 4 seconds after opening the flow rate control valve.

3. The method according to claim 1, wherein the reference flow rate is 220 to 240 gallons per minute (gpm).

4. The method according to claim 1, wherein, when accelerating the opening speed of the flow rate control valve, the opening speed or acceleration of the flow rate control valve is controlled within 0.5 to 1 second.

5. The method according to claim 1, further comprising, after accelerating the opening speed of the flow rate control valve, decreasing the flow rate of liquid passing through the flow rate control valve to a fourth speed that is greater than a third speed, when the flow rate reaches a first target flow rate.

6. The method according to claim 5, wherein, when decreasing the flow rate of liquid passing through the flow rate control valve to the fourth speed, the opening speed of the flow rate control valve is controlled within 0.5 to 0.9 seconds.

7. The method according to claim 5, further comprising, after decreasing the flow rate of liquid passing through the flow rate control valve to the fourth speed, increasing the flow rate of liquid passing through the flow rate control valve when the flow rate reaches a second target flow rate.

8. The method according to claim 7, further comprising, after increasing the flow rate of liquid passing through the flow rate control valve when the flow rate reaches the second target flow rate, maintaining the flow rate of liquid passing through the flow rate control valve when the flow rate reaches a third target flow rate.

9. The method according to claim 1, wherein, when the sensed flow rate is greater than the reference flow rate, the flow rate control valve is continuously opened at the first speed.

10. The method according to claim 9, further comprising:

when the flow rate reaches a first target flow rate while the flow rate control valve is opened at a first speed, decreasing the flow rate of liquid passing through the flow rate control valve.

11. The method according to claim 1, further comprising:

when the flow rate reaches a second target flow rate, increasing the flow rate of liquid passing through the flow rate control valve to a third target flow rate.

12. The method according to claim 11, further comprising:

when the flow rate reaches the third target flow rate, maintaining the flow rate of liquid passing through the flow rate control valve at the third target flow rate.

* * * * *